(12) United States Patent
Lövgren

(10) Patent No.: US 12,067,446 B2
(45) Date of Patent: Aug. 20, 2024

(54) CARD HOLDER DATA EXTRACTION

(71) Applicant: Axxtrans AB, Täby (SE)

(72) Inventor: Eric Lövgren, Stockholm (SE)

(73) Assignee: AXXTRANS AB, Täby (SE)

( * ) Notice: Subject to any disclaimer, the term of this patent is extended or adjusted under 35 U.S.C. 154(b) by 0 days.

(21) Appl. No.: 17/739,683

(22) Filed: May 9, 2022

(65) Prior Publication Data

US 2023/0359839 A1 Nov. 9, 2023

(30) Foreign Application Priority Data

May 6, 2022 (SE) .................... 2250552-3

(51) Int. Cl.
*G06K 7/10* (2006.01)
(52) U.S. Cl.
CPC .................. *G06K 7/10366* (2013.01)
(58) Field of Classification Search
CPC ........... G06K 7/10366; G06Q 20/3572; G06Q 20/367
USPC ......................................................... 235/451
See application file for complete search history.

(56) References Cited

U.S. PATENT DOCUMENTS

| | | | |
|---|---|---|---|
| 6,003,014 | A | 12/1999 | Lee et al. |
| 6,018,717 | A | 1/2000 | Lee et al. |
| 11,334,862 | B2 * | 5/2022 | Wang ................. G06Q 20/3263 |
| 2002/0194135 | A1 | 12/2002 | Taylor et al. |
| 2008/0140516 | A1 | 6/2008 | Silbernagl et al. |
| 2009/0103730 | A1 | 4/2009 | Ward et al. |
| 2010/0252624 | A1 | 10/2010 | Van De Velde et al. |
| 2015/0212753 | A1 | 7/2015 | Malzahn et al. |
| 2018/0293580 | A1 | 10/2018 | Potadar |
| 2020/0134626 | A1 * | 4/2020 | Abouelenin ............ H04L 63/08 |
| 2021/0004786 | A1 | 1/2021 | Mossler et al. |
| 2022/0014912 | A1 * | 1/2022 | Wilson ................. G06Q 20/227 |
| 2022/0060889 | A1 * | 2/2022 | Bellenger ........... H04W 12/037 |
| 2023/0079567 | A1 * | 3/2023 | Mamut ............. G06Q 20/3572 |
| | | | 705/41 |

FOREIGN PATENT DOCUMENTS

JP 2020030774 A 2/2020
WO 2020191456 A1 10/2020

OTHER PUBLICATIONS

"EMV Integrated Circuit Card Specifications for Payment Systems", EMVCo Terminal Type Approval: Level 1 Protocol Test Cases, Version 4.3 a, Nov. 2015, retrieved online at https://www.emvco.com/wp-content/uploads/2017/05/IFM_L1_Protocol_Test_Cases_v43a_20151103.pdf.

* cited by examiner

*Primary Examiner* — Ahshik Kim
(74) *Attorney, Agent, or Firm* — Renner, Otto, Boisselle & Sklar, LLP

(57) ABSTRACT

A method and a card reader for extracting Card Holder Data, CHD, from an Integrated Circuit Card, ICC, on a payment card. The card reader sends a request for a file list of Application Identifier's, AID's, stored in the ICC of the payment card, and checks if a Short File Identifier, SFI, associated with the AID is stored in a memory of the card reader. If not stored a Get Processing Options, GPO, command is executed to extract the SFI from the ICC, which is stored in the memory. Then the card reader 6 reads the CHD files according to the SFI and extracts a Primary Account Number, PAN. If CHD is already stored the card reader reads the CHD files according to SFI and extracts PAN directly.

12 Claims, 2 Drawing Sheets

CARD HOLDER DATA EXTRACTION

This application claims priority of Sweden Application No. 2250552-3, filed May 6, 2022, which is hereby incorporated herein by reference in its entirety.

TECHNICAL FIELD

The present invention relates generally to extraction of Card Holder Data, CHD, from an Integrated Circuit Card, ICC, of a payment card, especially a payment card using EMV® card technology.

BACKGROUND ART

In the beginning of 2000, Eurocard, Mastercard and Visa introduced a standard for integrated circuit cards, named EMV® standard after the founders Eurocard, Mastercard and Visa. The standard is closer described in "Integrated Circuit Card Specifications for Payment Systems", which comprises four books, namely Book 1 "Application Independent ICC to Terminal Interface Requirements", Book 2 "Security and Key Management", Book 3 "Application Specification" and Book 4 "Cardholder, Attendant, and Acquirer Interface Requirements" of which Book 2 and 3 are the most relevant in context of the present invention. All books are available on the website http://www.emvco.com. The object with EMV® was to increase the security of payment cards.

According to the EMV® standard the application in the card holds CHD, including data such as the Primary Account Number, PAN. When a transaction is made the payment terminal will select data to read and also send data back to the payment card for valuation and other processes. The PAN and other more sensitive data are sent to the payment terminal upon on request by the payment terminal which sends a command for executing a function in the ICC, known as Get Processing Options, GPO. When the GPO is executed, it increments an Application Transaction Counter, ATC, in the ICC of the payment card. The ATC value is included in the transaction that is going to an acquiring host and is synchronized with a counter held in the host. The acquirer and card issuer do not permit that the difference between the ICC-ATC and host-ATC is too big. If the difference exceeds a threshold value, the card can be blocked and thus not be used any more.

With the development of ICC on the payment card, the payment card itself could be used for more functions. Currently there are several discussions and projects in the industry where ICC is used for more than just payments, for example it could be used for identification, for access systems by extracting data from the ICC, especially sensitive data such as PAN in order to tie the payment card to a specific individual. As mentioned above, extracting sensitive data is done by executing GPO, which, as also mentioned above, triggers an increment of the ATC in the ICC. However, these non-payment functions of the payment card are most of the time performed off-line compared to transactions which often are made online with an acquiring host. This results in that ATC in the ICC is incremented without being synchronized with the host ATC. If this is made once there is no problem, but if repeated off-line increments of the ATC are performed the difference between the ICC-ATC and the host-ITC will eventually exceed the threshold value and the payment card will be blocked next time it synchronizes with the host-ATC. This could for example occur when the payment card is used as access control into different buildings or rooms in the building, which may trigger the ATC many times before the payment card is connected to the host and synchronized online. This will lead to blocked ICC-cards and is something that according to the EMV® standard cannot be handled by the host.

U.S. Pat. No. 6,003,014 discloses an early attempt of a method for using a smart card for acquiring access. The method uses a smart card to gain access through an access device upon payment of a value and is performed by operatively coupling the card to the access device. The access device reads a first and a second set of data from the card and performs a first authentication process on the first set of data. Access is permitted if the first authentication process meets a required condition. Access is otherwise denied. If access is permitted, the second set of data is stored in the access device for further processing, including a second authentication process which operates on the first and second sets of data. Since the method does not use the EMV® standard this method does not have the above-mentioned problem with the ATC.

US patent application 2018/293,580 discloses a method and a system for processing an access request to a physical asset. The system includes an access control terminal coupled to the physical asset and operable to read a token from a user token device associated with a user, and generate control signals to allow access to the physical asset, an access control processing server operable to receive an access request from the access control terminal, the access request including the token, generate an authentication verification request including the token, send the authentication verification request to a network, receive an authentication response from the network, generate an access control response to cause the access control terminal to allow access to the asset in response to the authentication response, and send the access control response to the access control response.

Thus, there is a need to be able to extract CHD from the ICC of a payment card without having a negative effect on the ATC, such that the payment card will be blocked when the number of off-line "transactions" reach above the threshold value before online synchronizations with a host is performed.

SUMMARY OF INVENTION

An object of the present invention is to accomplish a method and a card terminal for extracting CHD data from the ICC of a payment card without negatively affecting the ATC.

According to one aspect of the present invention this object is achieved with a method of extracting CHD, from an ICC on a payment card, which is configured according to Eurocard Mastercard Visa, EMV®, standard, the extraction of CHD is made by a card reader comprising a processor and a memory and which is connected to an external database, the method comprises establishing wireless communication between the payment card and the card reader, sending from the card reader, a request for a file list of Application Identifier's, AID's, stored in the ICC of the payment card, selecting, in the card reader, one application from the file list of AID's received in the card reader, checking if a Short File Identifier, SFI, associated with the AID is stored in the memory or in the external database. If the SFI is stored in the memory or in the database, reading the SFI, from the memory or external database as indexed by the AID, and reading CHD files according to the SFI and extracting a Primary Account Number, PAN. If the SFI is not stored in the memory or in the external database the following is performed, executing a Get Processing Options, GPO, command from the card reader in the payment card and extract the SFI from the ICC, storing the extracted SFI as indexed by the selected AID in the memory and/or in the external database, and reading CHD files according to the SFI and extracting PAN.

In an exemplary embodiment the step of establishing wireless communication comprises, sending a command Application Protocol Data Unit, APDU, from the card reader to the payment card when the payment card is within reading distance of the card reader, and receiving, in the card reader, a response APDU from the payment card.

In another exemplary embodiment the method further comprises creating a token from the PAN useable for the card reader, which created token together with the card reader are used as access control to a facility.

In an exemplary embodiment the selected application is the default application.

In another exemplary embodiment establishing wireless communication is done with Near Field Communication, NFC.

According to another aspect of the present invention the object is achieved with a card reader for extracting Card Holder Data, CHD, from an Integrated Circuit Card, ICC, on a payment card, which is configured according to Eurocard Mastercard Visa, EMV®, standard, the card reader comprises a processor and a memory and is connected to an external database, wherein the memory comprises instructions which when executed by the processor causes the card reader to establish wireless communication with the payment card, send a request for a file list of Application Identifier's, AID's, stored in the ICC of the payment card, select one application from a file list of the received AID's and check if a Short File Identifier, SFI, associated with the AID, is stored in the memory or in the external database. If the SFI is stored in the memory or the external database read the SFI from the memory or external database as indexed by the AID and read CHD files according to SFI and extract a Primary Account Number, PAN. If the SFI is not stored in the memory or in the database execute a Get Processing Options, GPO, command generated in the card reader in the payment card and extract the SFI from the ICC, store the extracted SFI as indexed by the selected AID in the memory and/or in the external database, and read CHD files according to SFI and extract PAN.

In an exemplary embodiment the card reader is caused to send a command Application Protocol Data Unit, APDU, to the payment card when the payment card is within reading distance of the card reader and receive a response APDU from the payment card to establish wireless communication.

In another exemplary embodiment the card reader is caused to create a token for the payment card from the PAN which created token together with the card reader are used as access control to a facility.

In an exemplary embodiment the card reader is caused to select a default application as the selected application.

In another exemplary embodiment the card reader is caused to establish wireless communication with Near Field Communication, NFC.

The advantage with the present invention is that it is possible to use the established infrastructure of the EMV® card technology and extend the usage of payment cards, not only to payments, but also to access control, identification etc., without repeated increments of the ATC which would lead to blocking of the payment card.

BRIEF DESCRIPTION OF DRAWINGS

The invention will now be described, by way of example, with reference to the accompanying drawings, in which.

DESCRIPTION OF EMBODIMENTS

Figure 1:
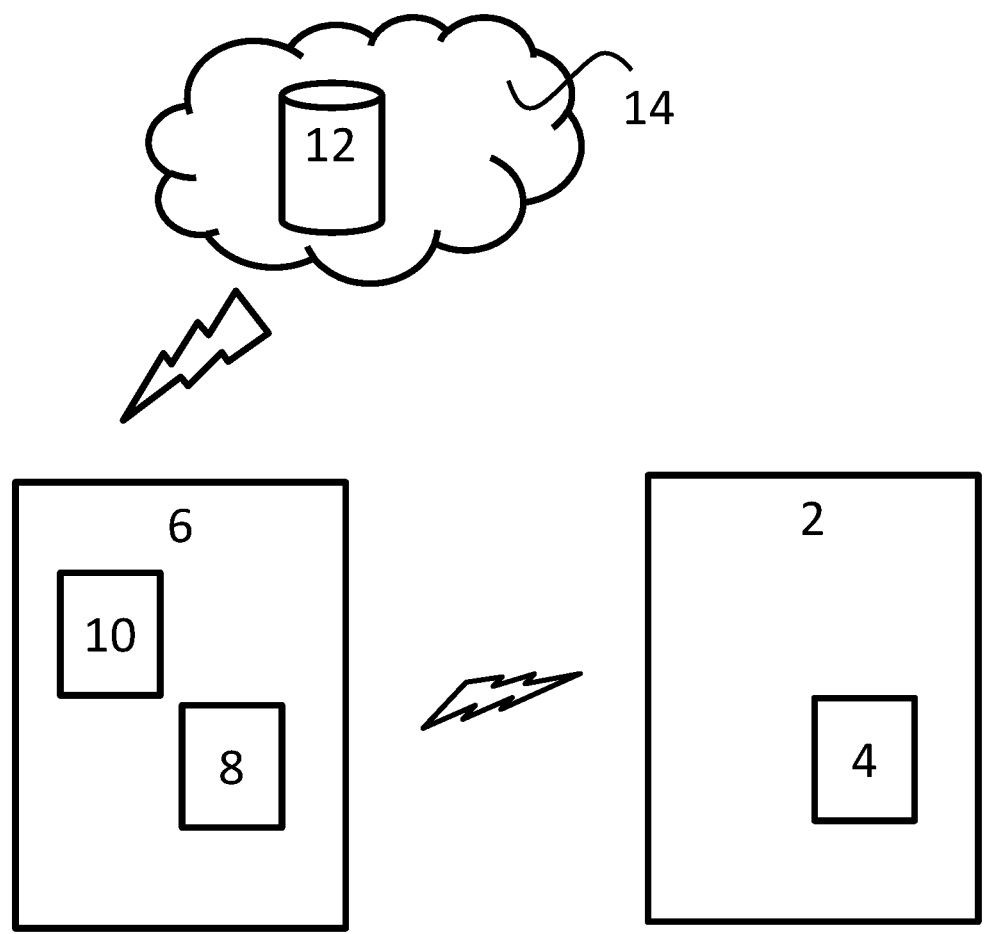
FIG. 1 is a schematic view of the interrelation of a payment card, a card reader, and an external database.

In the following, a detailed description of the invention will be made. FIG. 1 is a schematic view of the interrelation of a payment card 2, a card reader 6 and an external database 12. The payment card 2 comprises an Integrated Circuit Card, ICC, in accordance with the EMV® card technology. The card reader 6 comprises a processor 8 and a memory 10. The external database 12 may be provided in a cloud 14 or in a server, at the same location as the card reader 6 or at any other suitable location. The card holder 6 may communicate with the external database 12 wirelessly or may be connected to the external database 12 by wire. The card holder 6 is configured to establish wireless communication with the payment card 2, when the payment card 2 is within reading distance from the card holder 2. The reading distance may vary depending on which wireless technology that is used, but preferably Near Field Communication, NFC, is used, which typically has a reading distance of about 0.1 m.

Figure 2:
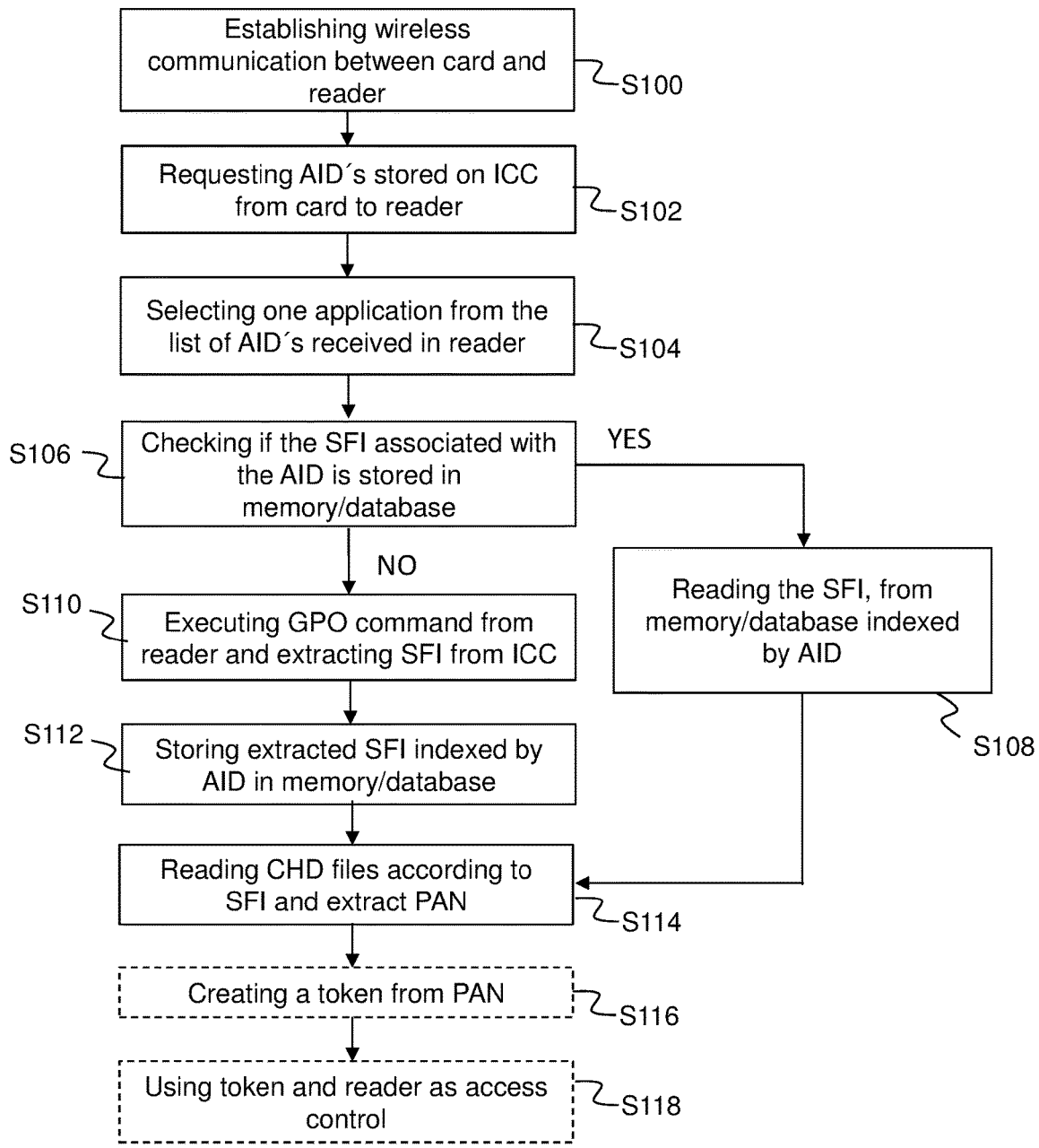
FIG. 2 is a flow chart showing the method according to the present invention.

Turning now to FIG. 2 a method of extracting CHD from the ICC 4 on the payment card 2 according to the present invention will be described. The payment card is configured according to the EMV® standard and the extraction of CHD is made by the card reader 6 comprising a processor 8 and a memory 10. The card reader 6 may also be connected to an external database 12.

Figure 3:
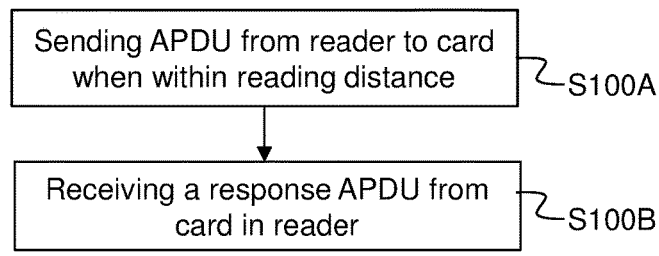
FIG. 3 is a flow chart of the step of establishing wireless communication between the payment card and the card reader.

The method starts when the payment card 2 is within reading distance of the card reader 6, i.e. typically within a distance of 0.1 m. In a first step S100 wireless communication is established between the payment card 2 and the card reader 6. In one exemplary embodiment, shown in FIG. 3, this is performed in that the card reader 6, in step 100A, sends a command Application Protocol Data Unit, APDU, to the payment card 2 when the payment card 2 is within reading distance of the card reader 6. In response thereto the payment card 2 sends a response APDU, which in step S100B, is received in the card reader 6.

Now when wireless communication has been established between the payment card 2 and the card reader 6, the card reader 6 sends, in step S102, a request for a file list of Application Identifier's, AID's, stored in the ICC 4 of the payment card 2. The list of AID's identifies applications that are supported by a terminal, when the payment card 2 is used for payments, and conform to the standard ISO/IEC 7816-4. The set of data that the ICC 4 contains in support for a given application is defined by an Application Definition File, ADF, selected by the terminal using a Select command and an Application File Locator, AFL, which are returned by the ICC in response to a Get Processing Options, GPO, command, which will be further described below. Among the applications stored in the ICC 4, there is usually a default application which is used by the terminal as long as the terminal does not request a special application. The applications contain data that can be used to identify the holder of the payment card, such as the Primary Account Number, PAN.

After the card reader 6 has received the file list of AID's the card reader 6, in S104, selects one of the applications from the file list of AID's and, in step S106, checks the AID to see if a Short File Identifier, SFI, associated with the AID is stored in the memory 10 or in the external database 12. If the SFI is already stored in the memory 10 or in the external database 12, the card reader 6 reads, in step S108 the Short File Identifier, SFI, from the memory 10 or external database 12 as indexed by the AID. The SFI is used to identify Application Elementary Files, AEF's, which contains data objects.

Thereafter the card reader 6 will read, in step S114, the CHD files according to SFI and extract PAN. The PAN may then in another application be used to identify the holder of the payment card 2, for example, to allow access to a building or to associate tickets, a passport or other identification to the payment card 2.

In the event the check, in step S106, reveals that no SFI associated with the AID is stored in the memory 10 or in the external database 12, the card reader 6 needs to retrieve the SFI. Thus, in step S110, the payment card 2 executes a Get Processing Options, GPO, command sent from the card reader 6 and extracts the SFI from the ICC 4. The extracted SFI is stored, in step S112, in the memory 10 and/or in the external database 12, as indexed by the selected AID. Thereafter, in step S114, the CHD files according to SFI are read and the PAN is extracted.

By using the above-described method it is possible to extract CHD repeated times, but only increment the ATC once, since the method always will check if the SFI associated with the AID is already stored and only execute the GPO if the SFI is not already stored. Thus, this will extend the usage of payment cards, not only to payments, but also to access control, identification etc., without repeated increments of the ATC which would lead to blocking of the payment card.

In an exemplary embodiment of the present invention the method may further comprise, in step S116, creating a token from the PAN useable for the card reader 6. The created token may in a further step, S118, be used together with the card reader 6 as an access control to a facility.

In another preferred embodiment of the present invention the selected application, in step S104, may be the default application of the file list of AID's received in the card reader 6.

Preferably the establishing of wireless communication between the card reader 6 and the payment card is done with Near Field Communication, NFC, but of course other equivalent technologies, such as RFID, Bluetooth or the like are also possible.

The present invention also relates to a card reader 6 configured to perform the method as described above. Turning once again to FIG. 1, the card reader 6 will be briefly described in order to avoid unnecessary repetitions.

The card reader 6 is used for extracting CHD from the ICC 4 on a payment card, which is configured according to Eurocard Mastercard Visa, EMV®, standard. The card reader 6 comprises a processor 8 and a memory 10 and is connected to an external database 12. The memory 10 of the card reader 6 comprises instructions which when executed by the processor 8 causes the card reader 6 to perform the following steps:

establish wireless communication with the payment card 2,
send a request for a file list of Application Identifier's, AID's, stored in the ICC of the payment card 2,
select one application from a file list of the received AID,
check if the Short File Identifier, SFI, associated with the AID is stored in the memory 10 or in the external database 12, and if stored
read the SFI from the memory 10 or external database 12 as indexed by the AID, and
read CHD files according to the SFI and extract a Primary Account Number, PAN,
and if not stored
execute a Get Processing Options, GPO, command generated in the card reader 6 in the payment card 2 and extract a Short File Identifier, SFI, from the ICC 4,
store the extracted SFI as indexed by the selected AID in the memory 10 and/or in the external database 12, and read CHD files according to SFI and extract PAN.

The card reader 6 is also in exemplary embodiments caused to perform all further method steps as described above in conjunction FIG. 2 and FIG. 3.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein and are intended to be encompassed hereby. In the exemplary figures, a broken line generally signifies that the feature within the broken line is optional.

The invention claimed is:

1. A method of extracting Card Holder Data, CHD, from an Integrated Circuit Card, ICC, on a payment card, the extraction of CHD is made by a card reader comprising a processor and a memory and which card reader is connected to an external database, the method comprising:

establishing wireless communication between the payment card and the card reader, wherein the payment card is configured according to Eurocard Mastercard Visa, EMV®, standard,
sending, from the card reader, a request for a file list of Application Identifier's, AID's, stored in the ICC of the payment card,
selecting, in the card reader, one application from the file list of AID's received in the card reader,
checking if a Short File Identifier, SFI, associated with the AID is stored in the memory or in the external database, and
if stored
reading the SFI from the memory or external database as indexed by the AID, and
reading CHD files according to the SFI and extracting a Primary Account Number, PAN, and
if not stored
executing a Get Processing Options, GPO, command from the card reader in the payment card and extract the SFI from the ICC once, storing the extracted SFI as indexed by the selected AID in the memory and/or in the external database, and reading CHD files according to SFI and extracting PAN.

2. The method according to claim 1, wherein the step of establishing wireless communication comprises:

sending a command Application Protocol Data Unit, APDU, from the card reader to the payment card when the payment card is within reading distance of the card reader, and receiving, in the card reader, a response APDU from the payment card.

3. The method according to claim 1, further comprising creating a token from the PAN useable for the card reader.

4. The method according to claim 3, further comprising:

using the created token and the card reader as access control to a facility.

5. The method according to claim 1, wherein the selected application is a default application.

6. The method according to claim 1, wherein establishing wireless communication is done with Near Field Communication, NFC.

7. A card reader for extracting Card Holder Data, CHD, from an Integrated Circuit Card, ICC, on a payment card, which is configured according to Eurocard Mastercard Visa, EMV®, standard, the card reader comprising a processor and a memory and is connected to an external database, wherein the memory comprises instructions which when executed by the processor causes the card reader to:

establish wireless communication with the payment card, send a request for a file list of Application Identifier's, AID's, stored in the ICC of the payment card, select one application from a file list of the received AID, check if a Short File Identifier, SFI, associated with the AID is stored in the memory or in the external database, and if stored read the SFI from the memory or external database as indexed by the AID, and read CHD files according to SFI and extract PAN, and if not stored execute a Get Processing Options, GPO, command generated in the card reader in the payment card and extract the SFI from the ICC once, store the extracted SFI as indexed by the selected AID in the memory and/or in the external database, and read CHD files according to SFI and extract PAN.

8. The card reader according to claim 7, wherein the card reader is further caused to send a command Application Protocol Data Unit, APDU, to the payment card when the payment card is within reading distance of the card reader and receive a response APDU from the payment card to establish wireless communication.

9. The card reader according to claim 7, wherein the card reader is further caused to create a token for the payment card from the PAN.

10. The card reader according to claim 9, wherein the card reader is further caused to use the created token as access control to a facility.

11. The card reader according to claim 7, wherein the card reader is further caused to select a default application as the selected application.

12. The card reader according to claim 7, wherein the card reader is further caused to establish wireless communication with Near Field Communication, NFC.

* * * * *